United States Patent
Suzuki et al.

(10) Patent No.: US 8,016,672 B2
(45) Date of Patent: Sep. 13, 2011

(54) DEVICE AND METHOD TO CONTROL GAME WHERE CHARACTERS ARE MOVED ON MAP

(75) Inventors: Takahisa Suzuki, Kanagawa (JP); Yusuke Iida, Tokyo (JP); Hitoshi Ishikawa, Tokyo (JP); Hiroyuki Goto, Tokyo (JP)

(73) Assignee: Sony Computer Entertainment Inc., Tokyo (JP)

( * ) Notice: Subject to any disclaimer, the term of this patent is extended or adjusted under 35 U.S.C. 154(b) by 417 days.

(21) Appl. No.: 12/356,686

(22) Filed: Jan. 21, 2009

(65) Prior Publication Data
US 2009/0247300 A1    Oct. 1, 2009

(30) Foreign Application Priority Data

Mar. 27, 2008  (JP) ................................. 2008-085040
Mar. 27, 2008  (JP) ................................. 2008-085041

(51) Int. Cl.
*A63F 13/06* (2006.01)
*A63F 13/10* (2006.01)
*A63F 9/24* (2006.01)

(52) U.S. Cl. ................ 463/30; 463/31; 463/36; 463/37; 463/38

(58) Field of Classification Search ................. 463/30, 463/31, 36, 37, 38
See application file for complete search history.

(56) References Cited

U.S. PATENT DOCUMENTS

| | | | |
|---|---|---|---|
| 7,812,814 B2 * | 10/2010 | Foxenland | ................ 345/156 |
| 7,837,552 B2 * | 11/2010 | Sumi et al. | ................ 463/23 |
| 7,898,542 B1 * | 3/2011 | Yu et al. | ................ 345/473 |
| 7,923,620 B2 * | 4/2011 | Foster | ................ 84/477 R |
| 2002/0005849 A1 | 1/2002 | Tsukizaki | |

* cited by examiner

*Primary Examiner* — Evan Pert
(74) *Attorney, Agent, or Firm* — Katten Muchin Rosenman LLP (57) ABSTRACT

A game device includes a player's character controller operative to control the movement of a player's character on a map, a non-player character controller operative to cause, of those non-player characters located on the map, non-player characters located within a predetermined range from the position of the player's character to join a procession following the player's character, and to move the non-player characters belonging to the procession to the position previously occupied by the player's character to allow the non-player characters to follow the player's character, and a procession controller operative to increase, upon receipt of a predetermined control input, the speed at which the non-player characters belonging to the procession to move to the position previously occupied by the player's character and to gather the non-player characters near the player's character.

12 Claims, 11 Drawing Sheets

DEVICE AND METHOD TO CONTROL GAME WHERE CHARACTERS ARE MOVED ON MAP

BACKGROUND OF THE INVENTION

1. Field of the Invention

The present invention relates to a game control technology and, more particularly, to a game device, game control method, and game control program adapted to control a game where characters are moved on a map.

2. Description of the Related Art

Many games are designed to move characters on a map set up for the game. Action games and role playing games are examples of such games.

[patent document No. 1] Published U.S. patent publication No. 2002/0005849

We have invented a novel game where not only the player's character is moved on a map but also a procession of non-player characters is caused to follow the player's character so as to lead the non-player characters to a desired place. We have also invented a technology to improve the entertainment quality of such a novel game.

SUMMARY OF THE INVENTION

The general purpose of the present invention is to provide a game control technology that provides high entertainment quality.

One aspect of the present invention relates to a game control program product. The game control program product comprises: a module that controls the movement of a player's character on a map; a module that causes, of those non-player characters located on the map, non-player characters located within a predetermined range from the position of the player's character to join a procession following the player's character; a module that moves the non-player characters belonging to the procession to the position previously occupied by the player's character to allow the non-player characters to follow the player's character; and a module that increases, upon receipt of a predetermined control input, the speed at which the non-player characters belonging to the procession to move to the position previously occupied by the player's character and gathers the non-player characters near the player's character.

Another aspect of the present invention also relates to a game control program product. The game control program product comprises: a module that controls the movement of a player's character on a map; a module that controls the movement of an enemy character on the map; a module that generates a first screen on which the player's character and the enemy character are displayed on the map; a module that generates a second screen that visually distinguishes between an area on the map where the player's character can move and an area where the player's character cannot move and that does not display the enemy character; and a module that switches between the first screen and the second screen for display.

Optional combinations of the aforementioned constituting elements, and implementations of the invention in the form of methods, apparatuses, and systems may also be practiced as additional modes of the present invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

The invention will now be described by reference to the preferred embodiments. This does not intend to limit the scope of the present invention, but to exemplify the invention.

The game device according to one embodiment provides a game where the player achieves a mission to control the player's character to move on a two-dimensional map, causes non-player characters located on the map in a distributed manner to follow behind and lead a predetermined number of non-player characters to a predetermined place on the map within a time limit. Non-player characters are hidden in buildings placed on a map. As the player's character approaches, they come out from the buildings. As the player's character approaches nearer, they follow the player's character and form a procession. The player moves the player's character on the map to cause many non-player characters to join the procession and leads them to the safety zone provided on the map by leading the procession. When the procession comes into contact with an enemy character, the non-player characters belonging to the procession behind the position of contact break away from the procession and hide in buildings again. When the player's character comes into contact with an enemy character, the game is over.

Figure 1:
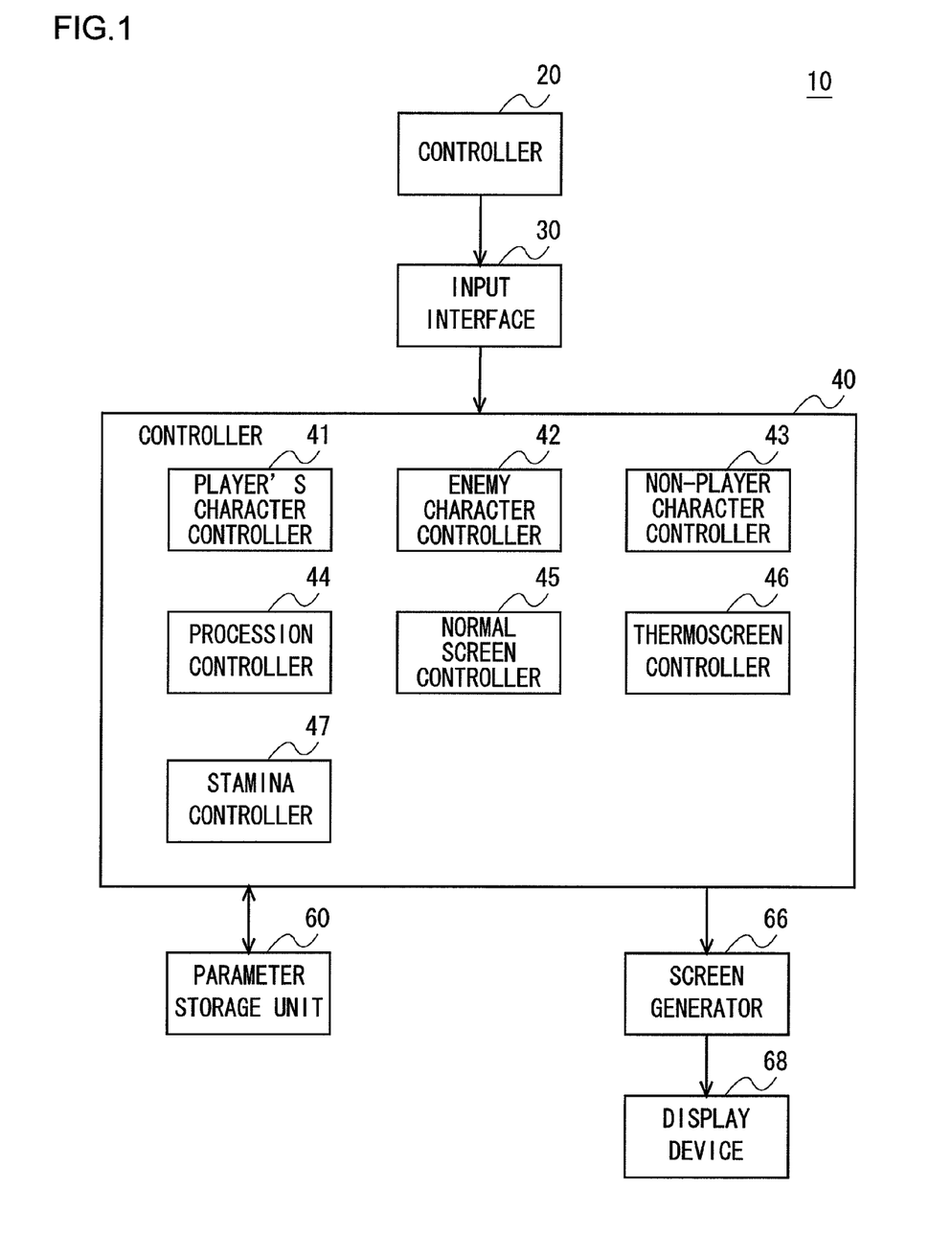
FIG. 1 shows the structure of a game device according to an embodiment of the present invention.

FIG. 1 shows the structure of a game device 10 according to the embodiment of the present invention. The game device 10 is provided with a controller 20, an input interface 30, a controller 40, a parameter storage unit 60, a screen generator 66 and a display device 68. The configuration is implemented, in hardware components, by any CPU of a computer, a memory, and in software by a program or the like loaded into the memory. FIG. 1 depicts functional blocks implemented by the cooperation of hardware and software. Therefore, it will be obvious to those skilled in the art that the functional blocks may be implemented in a variety of manners by hardware only, software only, or a combination of thereof.

The input interface 30 acknowledges a control signal input from the controller 20 manipulated by the player. Based on a control input from the player acknowledged by the input interface 30, the controller 40 moves the player's character on a map and allows the game to progress accordingly. The parameter storage unit 60 holds map data and data for characters, items, etc. placed on the map. The screen generator 66 generates a game screen controlled by the controller 40 and displays the screen on the display device 68.

Figure 2:
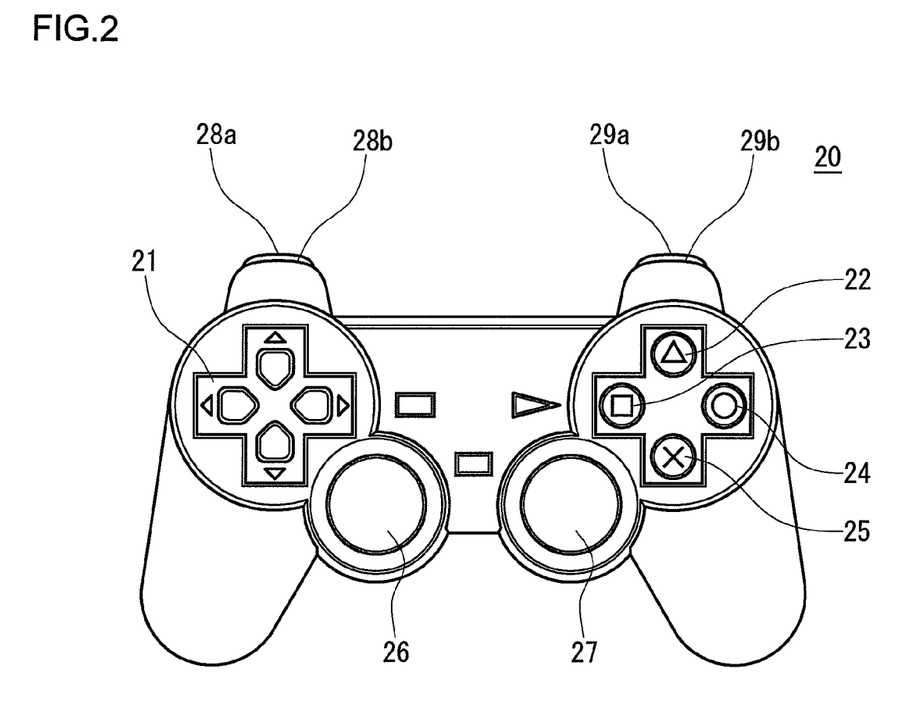
FIG. 2 shows the appearance of a controller.

FIG. 2 shows the appearance of the controller 20. On the top surface of the controller 20 are provided directional buttons 21, a triangular button 22, a square button 23, a circular button 24, a x button 25, and analog sticks 26 and 27. On the sides of the controller 20 are provided L1 button 28a, L2 button 28b, R1 button 29a, and R2 button 29b. According to the embodiment, the analog stick 26 is assigned the function of moving the player's character in a direction designated by an input, the analog stick 27 is assigned the function of moving the displayed area of the map in a direction designated by an input, R1 button 29a is assigned the function of zooming in on the map, and R2 button 29b is assigned the function of zooming out of the map. The triangular button 22 is assigned the function of increasing the speed of moving the player's character, the x button 25 is assigned the function of switching to a thermoscreen described later, the circular button 24 is assigned the function of assembling non-player characters belonging to the procession near the player's character.

The parameter storage unit 60 stores various parameters necessary for game progress including map data, positional data and image data for the player's character, for the enemy character, for non-player characters, and for items provided on the map, the stamina of the player's character, and the cumulative number of non-player characters led to the safety zone. According to the embodiment, image data for aerial photographs of a town that actually exists is used as map data. In addition to the image data for aerial photographs, the parameter storage unit 60 stores data for a map that distinguishes between an area such as roads and open squares where the player's character can move, and an area such as buildings and rivers where the player's character cannot move, using different shades. Such data will hereinafter be referred to as collision data. In addition to the collision data, the unit 60 also stores data for shadowed areas behind buildings. Such data will hereinafter be referred to as mask data.

On the map are provided an item that allows the maximum stamina of the player's character to be regained, an item that allows half of the maximum of the player's character to be regained, an item that makes the player's character invisible, an item that halts an enemy character, an item that warps the player's character and the non-player characters belonging to a procession, etc.

A stamina controller 47 sets up the maximum value of the stamina of the player's character according to the number of non-player characters belonging to the procession following the player's character and stores the value in the parameter storage unit 60. The stamina controller 47 accumulates stamina by incrementing the current value of stamina stored in the parameter storage unit 60 according to the time elapsed. The stamina controller 47 may increase the speed at which stamina is increased according to the number of non-player characters belonging to the procession. When the player's character obtains an item which recovers stamina, the stamina controller 47 increases stamina to the value set in the item. When the stamina of the player's character reaches the maximum, the stamina controller 47 maintains the maximum value, without incrementing stamina any more. While the player's character is moving at a high speed or gathering non-player characters, the stamina controller 47 consumes stamina by reducing stamina at a predetermined rate according to the time elapsed, as mentioned later.

A player's character controller 41 moves the player's character on a map according to a control instruction input from the controller 20. The player's character controller 41 computes the position of the player's character for every frame generated in the screen generator 66. The player's character controller 41 adds a vector of a predetermined length aligned in the direction input via the analog stick 26 to the current position of the player's character so as to compute the position of the player's character in the next frame. The player's character controller 41 refers to the collision data stored in the parameter storage unit 60 to check whether the computed position is within an area where the character can move. If the computed position is within an area where the character cannot move, the controller 41 moves the character to an area where the character can move. For example, the controller 41 may move the character to a position that is closest to the computed position and that can be accessed from the previous position without entering an area where the character cannot move.

While the triangular button 22 is pressed, the player's character controller 41 enlarges the velocity vector of the player's character so as to increase the moving speed of the player's character. In this process, the player's character controller 41 causes the stamina controller 47 to decrease stamina at a predetermined rate. When stamina is zero, the player's character controller 41 forbids the high speed movement of the player's character. Even if the triangular button 22 is pressed, the controller 41 disregards the input and moves the character at the normal speed.

When the player's character obtains an item to create an invisible state, the player's character controller 41 displays the player's character in a mode different from the normal mode on a display screen until a predetermined time elapses. The player's character controller 41 also informs the enemy character controller 42 that the player's character is invisible and prevents the enemy character from discovering the player's character and starting an attack. When a predetermined time elapses, the player's character controller 41 returns the display mode of the player's character to normal and notifies the enemy character controller 42 that the player's character is no longer invisible.

When the player's character enters the safety zone set up on the map, the player's character controller 41 calculates an accumulated total number of non-player characters belonging to the procession at that point of time and stores the number in the parameter storage unit 60. When the accumulated total number of non-player characters reaches the norm set up in advance, it is determined that mission is attained and the player successfully completed the game. The player's character controller 41 determines that the game is over when the player's character comes into contact with an enemy character.

The enemy character controller 42 controls the movement of an enemy character. Various enemy characters each with its unique individuality may be set up. For example, some enemy characters provided on the map may move at a high speed but not chase the player's character. Others may move at a low speed but start an attack when it discovers the player's character. In the latter case, the enemy character controller 42 sets up a field of view of the enemy character. A determination is made frame by frame as to whether the player's character is located within the field of view of the enemy character. If the player's character is located, it is determined that the enemy character discovers the player's character and the enemy character is caused to make a transition to an attack mode. In this process, the enemy character controller 42 increases the moving speed of the enemy character that made a transition to the attack mode. The controller 42 further moves the enemy character in the direction of the current position of the player's character so as to follow the player's character. The enemy character controller 42 may release the attack mode when a predetermined time elapses after causing the enemy character to make a transition to the attack mode. The enemy character controller 42 may move the enemy character along a path defined in advance, when the enemy character has not made a transition to the attack mode.

When the player's character obtains an item that halts the enemy character, the enemy character controller 42 does not move the enemy character and halts it on the spot until a predetermined time elapses. Further, when the player's character obtains an item that creates an invisible state, the controller 42 does not allow the enemy character to make a transition to the attack mode until a predetermined time elapses even if the player's character enters the field of view of the enemy character.

The non-player character controller 43 refers to the parameter storage unit 60 to extract buildings located within a predetermined range from the current position of the player's character and moves the non-player characters located inside the extracted buildings out of the buildings. An entrance may be provided in the buildings and the non-player characters are controlled in this case to come out of the buildings from the entrance. Of those non-player characters outside the buildings, the non-player character controller 43 causes the non-player character within a predetermined range from the position of the player's character to join the procession following the player's character. In this process, the non-player character controller 43 modifies the data for the non-player characters stored in the parameter storage unit 60 to indicate that the non-player characters belong to the procession. As described later, when the procession controller 44 groups and manages a plurality of non-player characters, data indicating the group to which the non-player characters belong may be stored. The non-player character caused to join the procession is thereafter controlled by the procession controller 44 to follow the player's character.

The procession controller 44 controls the procession formed by the non-player characters following the player's character. The procession controller 44 stores the positions of the player's character in the several past frames and moves the non-player characters belonging to the procession to the position where the player's character was. When the procession comes into contact with an enemy character, the procession controller 44 causes the non-player characters belonging to the procession behind the position of contact to break away from the procession and move to buildings. When an input via the circular button 24 is acknowledged, the procession controller 44 increases the speed at which the non-player characters belonging to the procession moves to the position where the player's character was and gathers the non-player characters near the player's character. Details of the operation of the procession controller 44 will be described later.

A normal screen controller 45 controls the generation of a game screen. The normal screen controller 45 first draws a map image of the display area currently set up at the magnification currently set up. Subsequently, the normal screen controller 45 draws the player's character, the enemy character, the non-player characters that have come out of the buildings, and the non-player characters belonging to the procession. The normal screen controller 45 further overlays mask data semi-transparently so as to provide shadow effects. In this way, characters in a shadowed area are drawn as if they are in the shadow.

When the normal screen controller 45 acknowledges an input via the analog stick 27, the controller 45 moves the display area of the map image in the direction designated by the input. When the player's character moves near the end of the display area of the map, the normal screen controller 45 moves the display area in the direction of the end automatically. For example, when the player's character moves near the left end of the map, the display area is moved leftward automatically. The normal screen controller 45 zooms in on the map image, when the input via the R1 button 29*a* is acknowledged, and, when the input via the R2 button 29*b* is acknowledged, the controller 45 zoom out of the map image.

The thermoscreen controller 46 controls the generation of a thermoscreen that visually distinguishes between an area on the map where the player's character can move and an area where it cannot. The thermoscreen also displays the distribution of non-player characters and does not display the enemy character. The thermoscreen controller 46 draws a map image of the display area currently set up at the magnification currently set up and then draws the player's character, the non-player characters that have come out of the buildings, and the non-player characters belonging to the procession. Subsequently, the thermoscreen controller 46 overlays mask data semi-transparently so as to provide shadow effects. The thermoscreen controller 46 further draws the collision data stored in the parameter storage unit 60 as a semitransparent overlay and distinguishes between an area on the map where the player's character can move and an area where it cannot, using different shades. Further, the thermoscreen controller 46 refers to the parameter storage unit 60 to display the distribution of non-player characters and displays the player's character. Details of the operation of the thermoscreen controller 46 will be described later.

Figure 3:
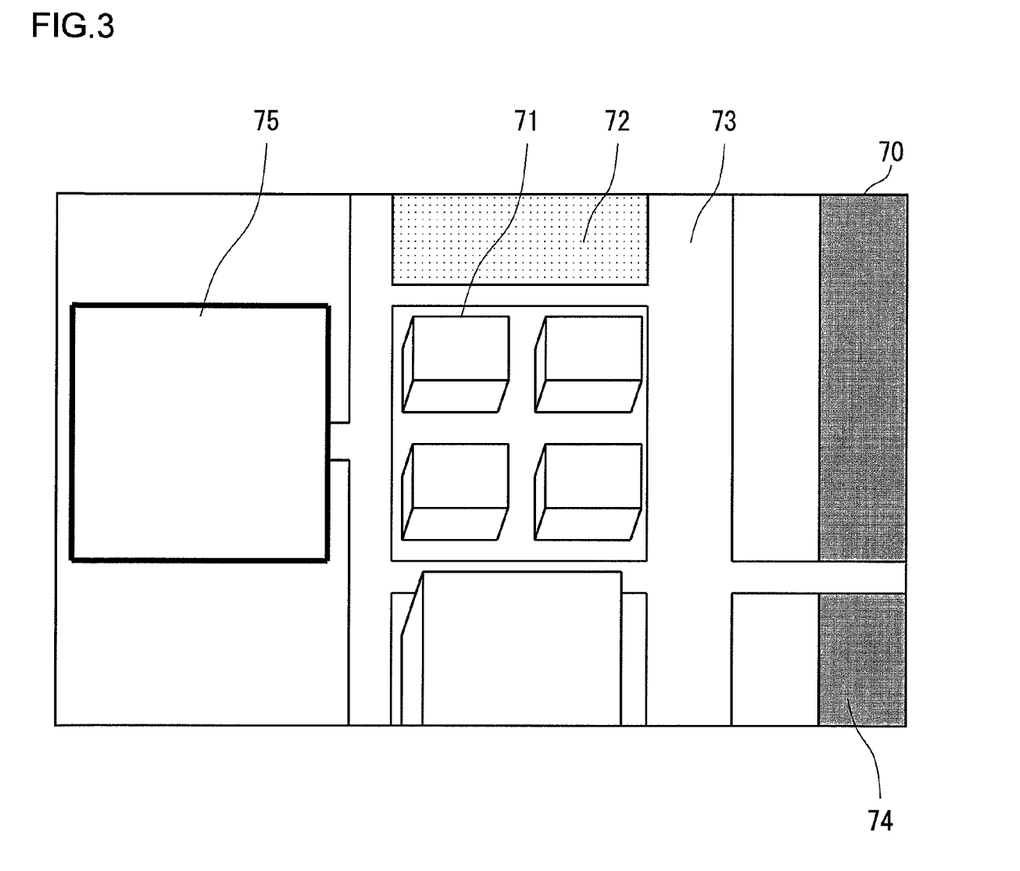
FIG. 3 shows an example of a map used in the game device according to the embodiment.

FIG. 3 shows an example of a map used in the game device according to the embodiment. A map 70 is an aerial photograph of the place that actually exists, where a building 71, a park 72, a road 73, a river 74, etc. are found. A safety zone 75 where the non-player characters find an escape is set up in this map 70.

Figure 4:
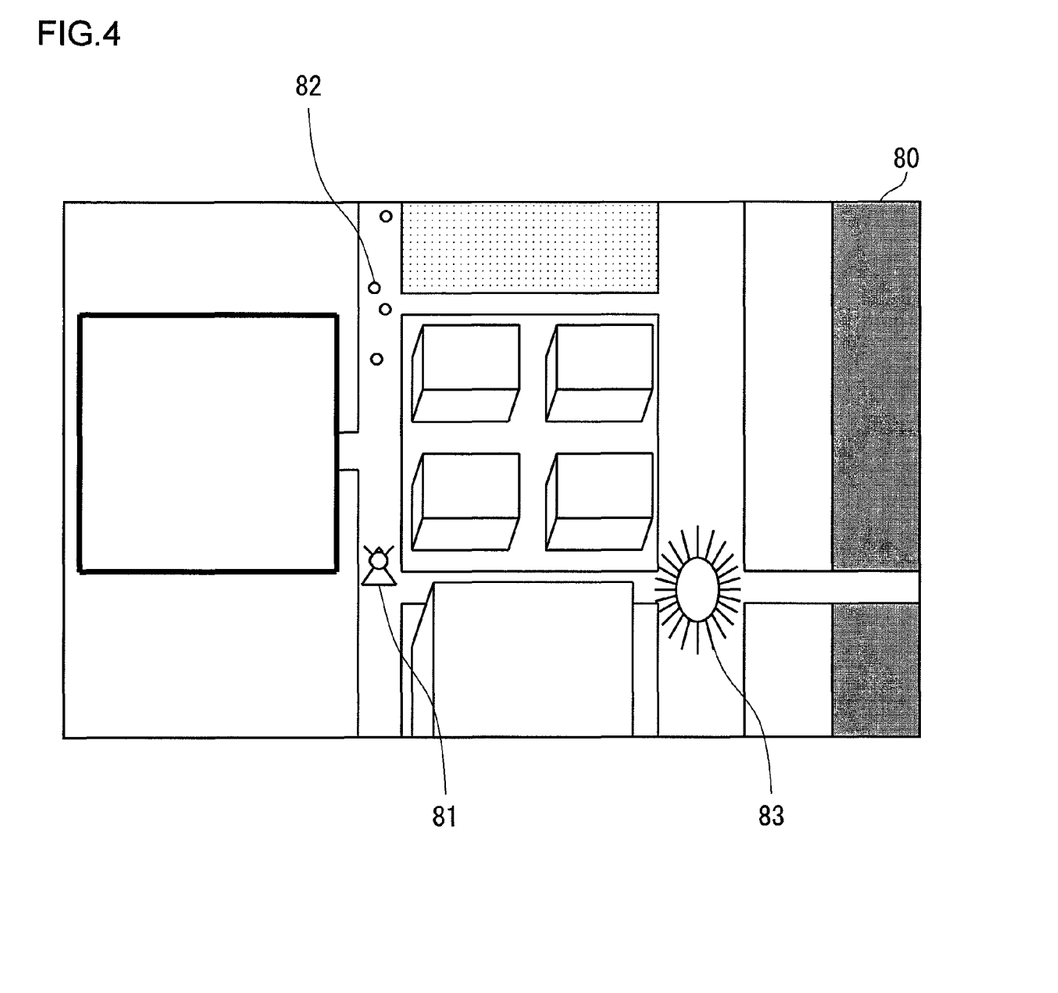
FIG. 4 shows an example of a screen displayed in the game device according to the embodiment.

FIG. 4 shows an example of a screen displayed in the game device according to the embodiment. In addition to the map 70, a player's character 81, a non-player character 82, and an enemy character 83 are displayed on a screen 80 generated by the normal screen controller.

Figure 5:
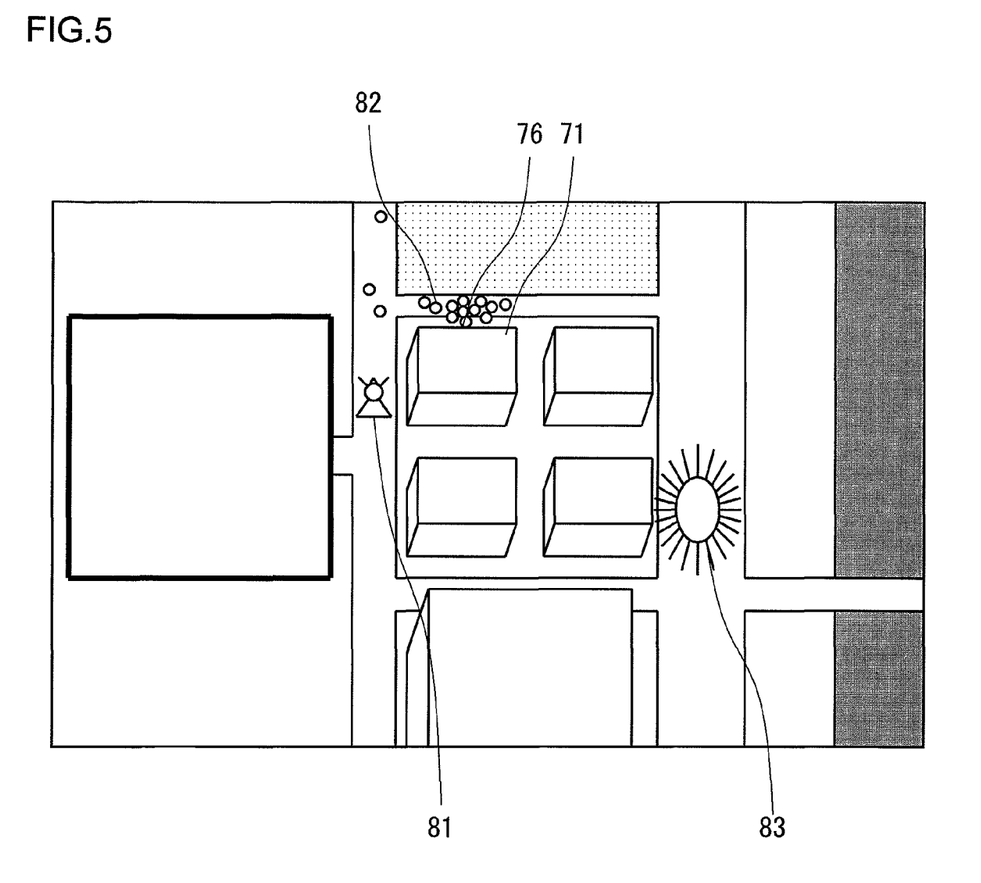
FIG. 5 shows an example of a screen shown when the player moves the player's character near a building.

FIG. 5 shows an example of a screen shown when the player uses the analog stick 26 to move the player's character 81 near the building 71. The non-player character controller 43 moves the non-player characters 82 located in the building 71 outside the building 71 via an entrance 76, when the player's character 81 is within a predetermined range from the building 71. When the player moves the player's character 81 near the non-player characters that came out of the building 71, the non-player character controller 43 causes the non-player characters located within a predetermined range from the player's character 81 to join the procession following the player's character 81.

Figure 6:
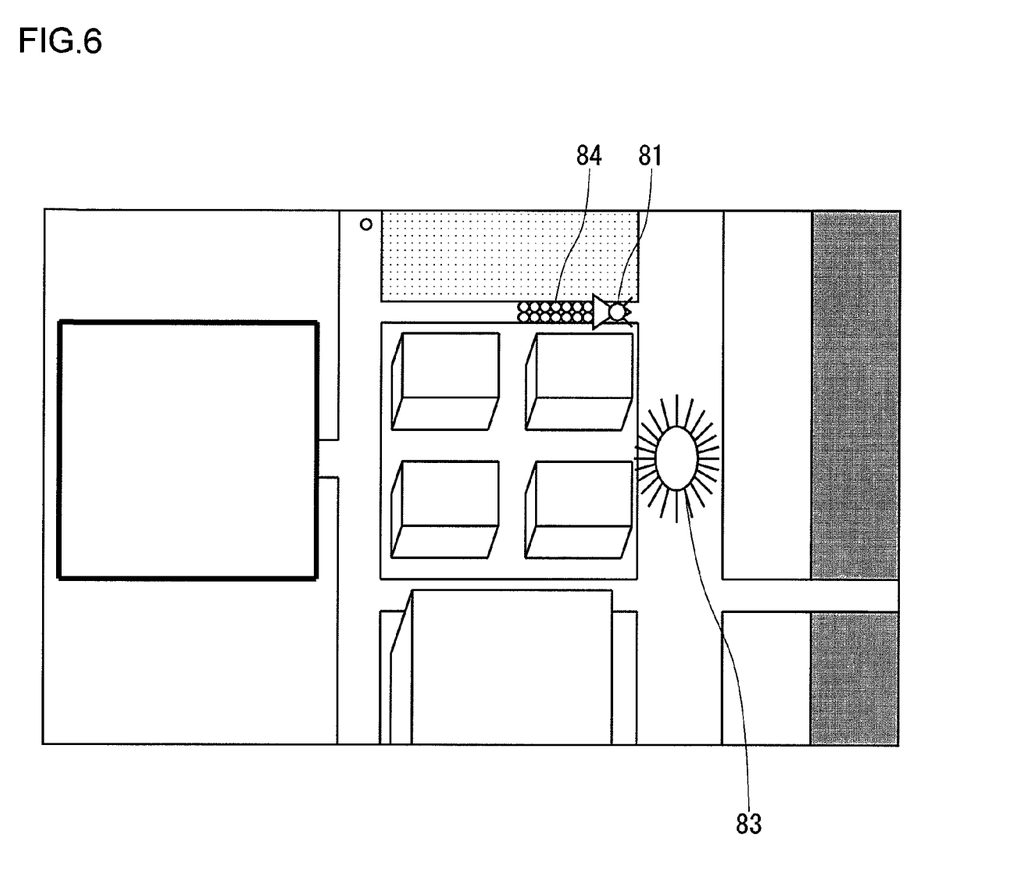
FIG. 6 shows an example of a screen shown when a non-player character is caused to join a procession following the player's character.

FIG. 6 shows an example of a screen shown when the non-player characters 82 are caused to join the procession following the player's character 81. A procession 84 formed by non-player characters follows the player's character 81 from behind. As described later, the procession controller 44 groups a plurality of non-player characters and controls the groups so that each group moves to the position previously occupied by the player's character 81. Thereby, the procession 84 is moved so as to follow the player's character 81.

Figure 7:
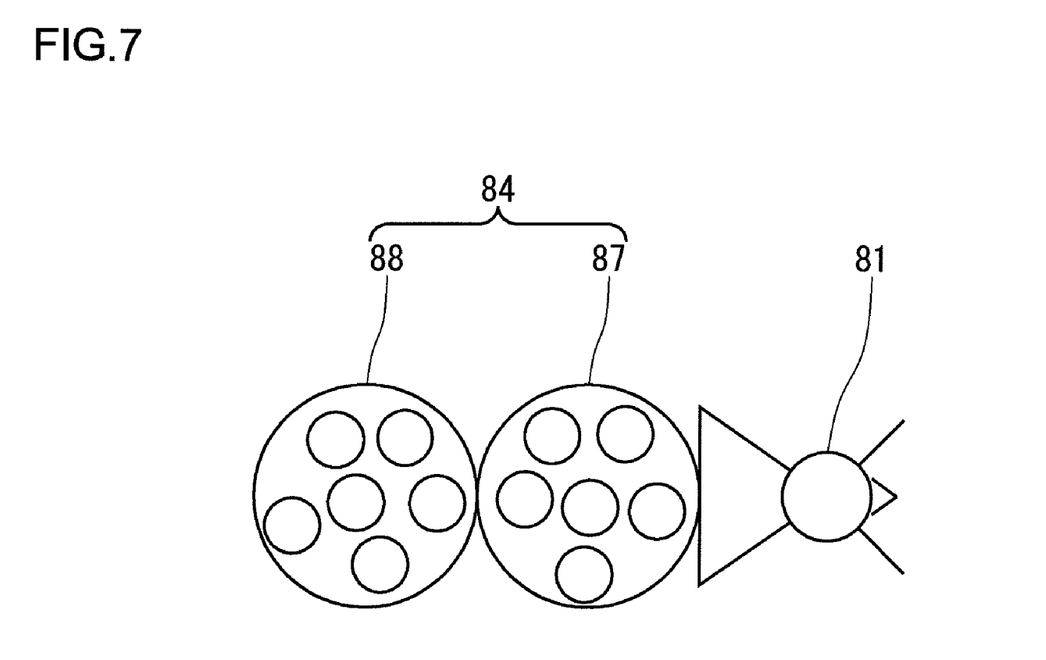
FIG. 7 shows how the procession controller groups and manages the non-player characters belonging to the procession.

FIG. 7 shows how the procession controller 44 groups and manages the non-player characters belonging to the procession. The procession controller 44 sets up behind the player's character 81 a virtual frame 87 that accommodates a predetermined number of non-player characters and locates the non-player characters caused to join the procession 84 in the frame 87 until the predetermined number is reached. When the number of non-player characters located in the frame 87 reaches the predetermined number, a frame 88 is set up further behind.

When the player's character 81 moves, the procession controller 44 moves the frame 87 toward the position previously occupied by the player's character 81 several frames before. The procession controller 44 gives the same vector to each non-player character located in the frame 87. Moreover, the controller 44 adds a vector to each non-player character so as to control the movement individually. In other words, the non-player characters move at random and independently within the frame 87. In this way, a realistic procession can be represented. The procession controller 44 moves the non-player characters in the frame 87 according to the movement of the frame 87 with a specified time lag. Thereby, the non-player characters can be controlled to respond to the movement of the player's character 81 with a slight delay before starting to move.

Figure 8:
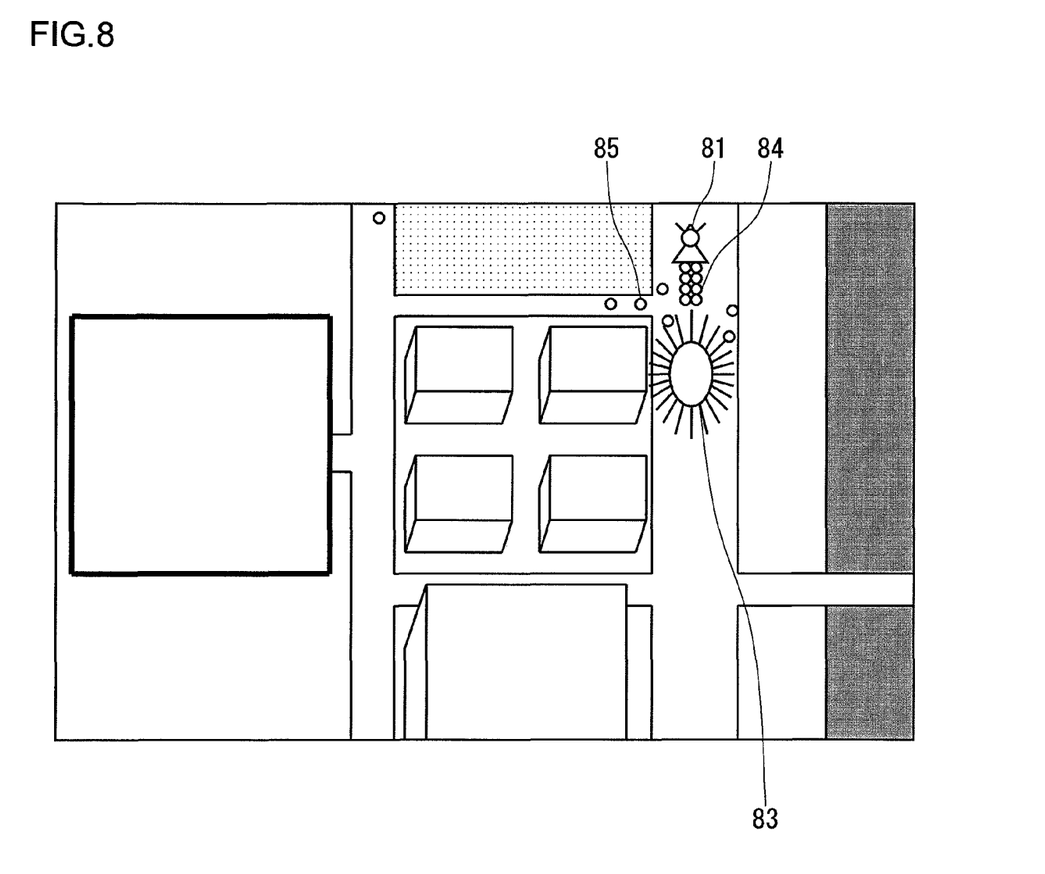
FIG. 8 shows an example of a screen shown when an enemy character comes into contact with the procession.

FIG. 8 shows an example of a screen shown when the enemy character 83 comes into contact with the procession 84. The procession controller 44 reads the position of the enemy character from the parameter storage unit 60 and determines whether the contact occurs, by comparing the position thus read with the position of the procession 84. If the enemy character touches a part of the procession 84, the procession controller 44 causes the non-player characters 85 belonging to the procession behind the position of contact with the enemy character to break away from the procession 84. The procession controller 44 may identify the frame with which the enemy character comes into contact and cause the non-player characters 85 located in the frames behind the contacted frame to break away from the procession 84. The non-player characters 85 that broke away may be returned to the buildings where the characters were located when the game started or may be moved to the buildings located near the position at which they broke away.

Figure 9:
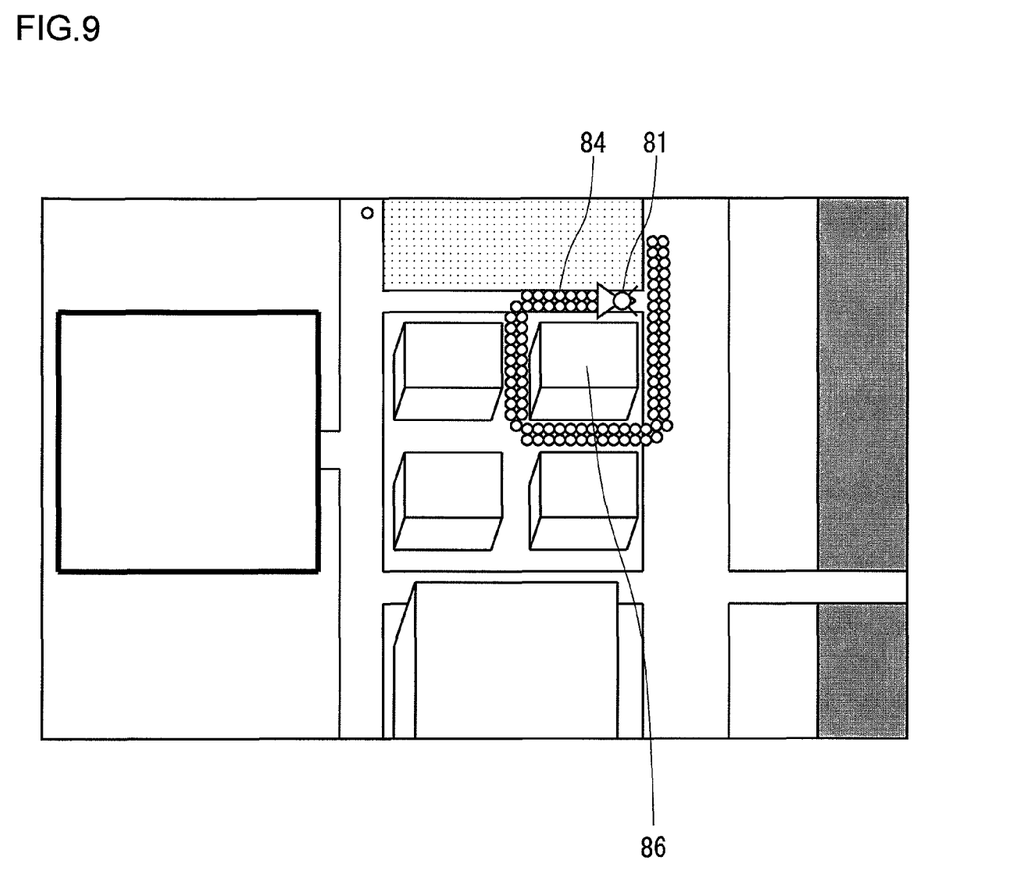
FIG. 9 shows an example of a screen shown when the procession surrounds a building.

FIG. 9 shows an example of a screen shown when the procession 84 surrounds a building 86. When a part of the procession 84 comes into contact with another part as a result of, for example, the player's character 81 passing the position previously passed for a second time, the procession controller 44 causes non-player characters located in an area enclosed by the contact to join the procession 84. The procession controller 44 may determine whether a closed area is formed by the procession 84 by determining whether contact occurs between frames included in the procession 84. The procession controller 44 determines the non-player characters located in the closed area enclosed by the procession 84 by referring to the parameter storage unit 60 and causes those non-player characters to join the procession 84.

For example, if the procession 84 has a length sufficient to surround the building 86 and if the procession 84 is successful in surrounding the building 86 as the player's character 81 goes around the building 86, all of the non-player characters located in the building 86 are caused to join the procession 84. Thereby, the player can cause the non-player characters to join the procession 84 efficiently. Even if there is a courtyard in the building 86 and the non-player characters located in the building 86 are only allowed to go out to the courtyard, the non-player characters located in the building 86 are caused to join the procession 4 by surrounding the building 86 by the procession 84.

By including a large number of non-player characters in the procession 84 and by increasing the length of the procession 84 accordingly, the procession can surround larger buildings so that the efficiency of including non-player characters in the procession 84 is improved. However, as the procession 84 becomes longer, the risk of coming into contact with the enemy character 83 is also increased. The embodiment addresses this by gathering the non-player characters belonging to the procession 84 near the player's character 81 so that the prolonged procession 84 is compressed.

Figure 10:
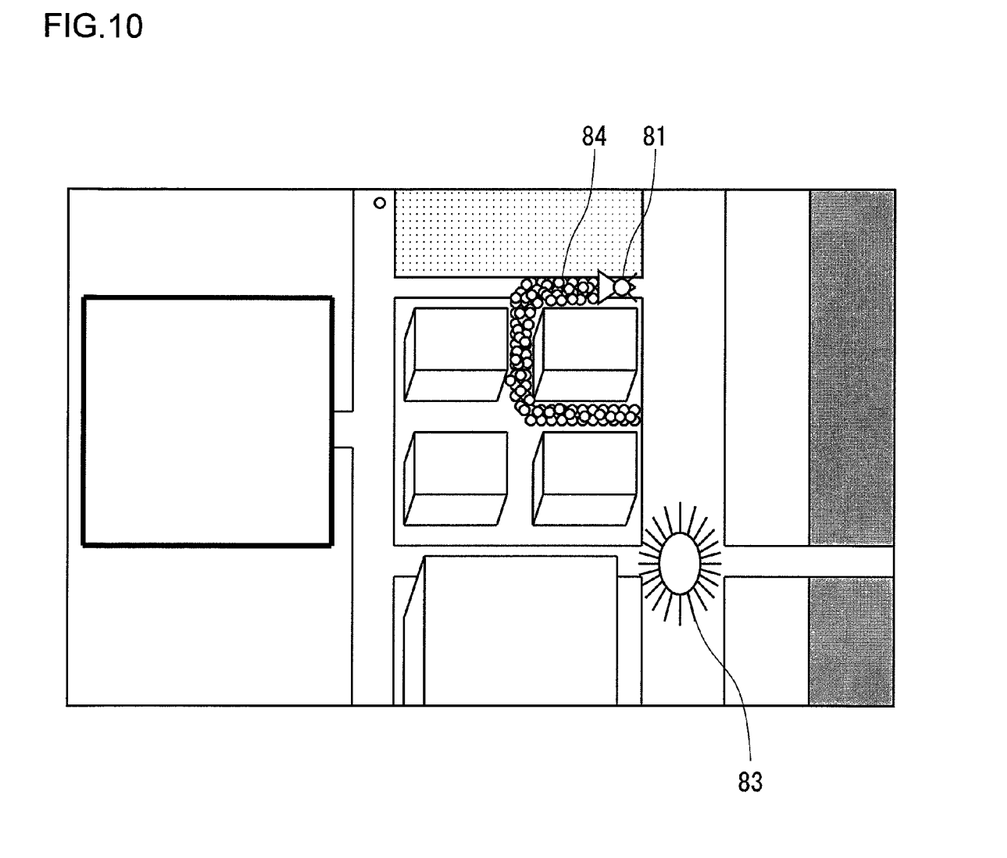
FIG. 10 shows an example of a screen shown when the player causes the non-player characters belonging to the procession to gather near the player's character.

FIG. 10 shows an example of a screen shown when the player causes the non-player characters belonging to the procession 84 to gather near the player's character 81. When the player presses the circular button 24 in the screen shown in FIG. 9, the procession controller 44 moves the groups of non-player characters belonging to the procession 84 at a speed twice the normal speed. Namely, in each frame, the non-player characters travel a distance normally traveled in two frames. This causes the non-player characters belonging to the procession 84 to move to the position previously occupied by the player's character 81 at a speed higher than the normal speed, so that the non-player characters gather near the player's character 81 and the length of the procession 84 is gradually reduced. By continuing to press the circular button 24 without moving the player's character 81, all of the non-player characters belonging to the procession 84 eventually gather where the player's character is. Even if the player's character is moved, the length of the procession 84 is reduced because the non-player characters move toward the player's character 81 at a speed higher than the moving speed of the player's character 81. This can make the prolonged procession 84 compact and reduces the risk of coming into contact with the enemy character 83.

The procession controller 44 causes the stamina controller 47 to decrease stamina while the circular button 24 is being pressed. When stamina is zero, the procession controller 44 forbids the compression of the procession. Even if the circular button 24 is pressed, the controller 44 disregards the input and uses the normal moving speed. Therefore, the function of compressing the procession near the player's character 81 cannot be used permanently. The period of time for which the state of compression can be maintained depends on the remaining amount of stamina. When all stamina is exhausted, it is necessary for the player to wait until stamina is accumulated again. This can prevent the level of difficulty of the game from being lowered unsuitably.

Figure 11:
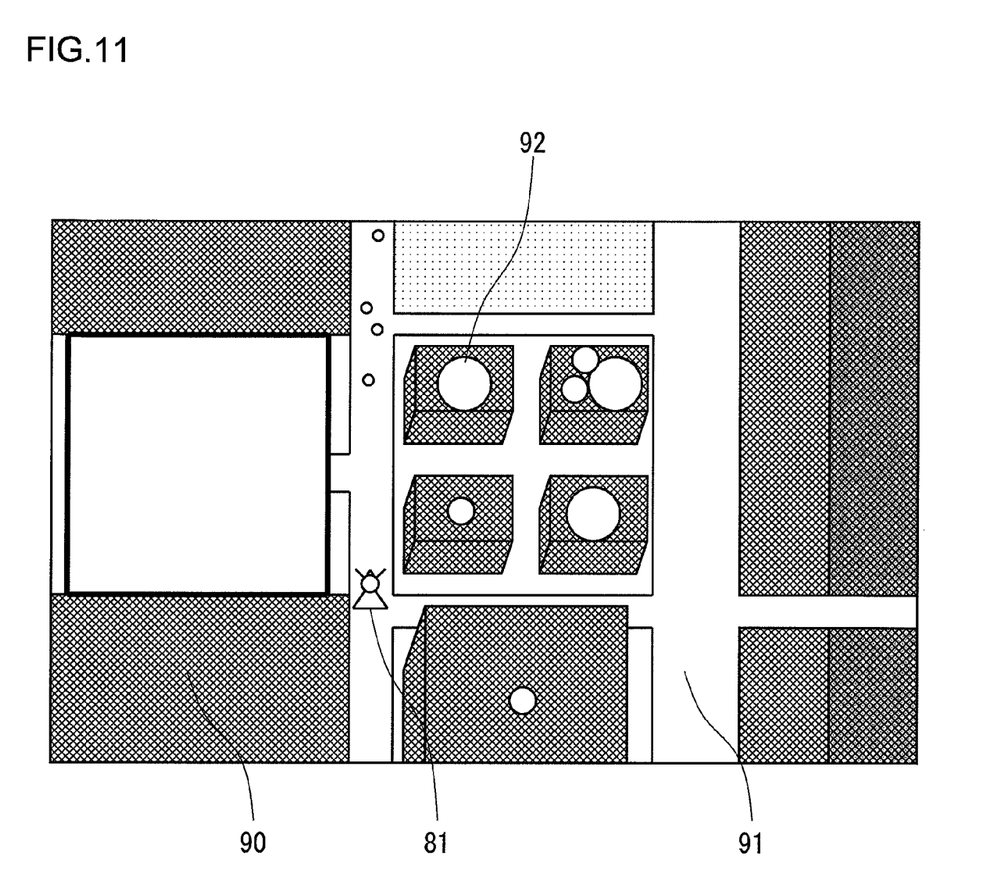
FIG. 11 shows an example of a thermoscreen displayed by the thermoscreen controller.

FIG. 11 shows an example of a thermoscreen displayed by the thermoscreen controller 46. In this embodiment, since the aerial photograph is used as a map, it may be difficult for the player to visually identify a road etc. on which the player's character 81 can travel. Also, the player needs to know which building contains many non-player characters hidden therein. Therefore, the thermoscreen controller 46 provides a thermoscreen that visually distinguishes between an area on the map where the player's character can move and an area where it cannot and that displays the distribution of the non-player characters. The thermoscreen controller 46 changes from the normal screen shown in FIG. 4 to the thermoscreen shown in FIG. 11, when the かける button 25 is pressed. According to this embodiment, the collision data stored in the parameter storage unit 60 is greenish on the whole. A lighter shade is used for an area in which the player's character can move and a darker shade is used for an area in which it cannot. Since the thermoscreen controller 46 draws the collision data as a semi-transparent overlay on the screen, the thermoscreen shown in FIG. 11 shows an area 91 such as roads and parks where the player's character can move, using a lighter shade, and displays an area 90 such as buildings and rivers where it cannot, using a darker shade. With this, the range in which the player's character can move can be identified visually. Since the screen turns greenish on the whole, distinction from the normal screen can be easily made.

The thermoscreen controller 46 refers to the parameter storage unit 60 to display an object 92 of a size that depends on the number of the non-player characters located inside the building. The thermoscreen controller 46 may display the object 92 categorized according to the number of non-player characters. For example, up to 9 characters may be indicated by an object of a certain size and 10 to 99 characters may be indicated by an object of another size. Thereby, the distribution of non-player characters can be displayed in a manner easy to understand visually.

Since the thermoscreen helps identify an area where the player's character can move and identify the distribution of the non-player characters, it will be easy for the player to continue playing using the thermoscreen. To maintain a suitable level of difficulty of the game, the thermoscreen controller 46 according to the embodiment does not display the enemy character on the thermoscreen. Therefore, there is a risk of coming into contact with the enemy character unknowingly if the player keeps playing using the thermoscreen. Therefore, the player needs to move the player's character by switching between the normal screen and the thermoscreen appropriately. In this way, the level of difficulty is suitably adjusted and the entertainment quality of the game is improved.

Given above is a description of the present invention based on the embodiment. The embodiment is intended to be illustrative only and it will be obvious to those skilled in the art that various modifications to constituting elements and processes could be developed and that such modifications are also within the scope of the present invention.

What is claimed is:

1. A non-transitory computer readable medium having embodied thereon a game control program product that causes a computer to move a player's character and non-player characters on a map, the program product comprising:
   a module that controls the movement of the player's character on the map;
   a module that causes, of those non-player characters located on the map, non-player characters located within a predetermined range from a position of the player's character to join a procession following the player's character;
   a module that moves the non-player characters belonging to the procession to a position previously occupied by the player's character to allow the non-player characters to follow the player's character; and
   a module that increases, upon receipt of a predetermined control input, the speed at which the non-player characters belonging to the procession move to the position previously occupied by the player's character and gathers the non-player characters near the player's character.

2. The non-transitory computer readable medium according to claim 1, further comprising:
   a module that controls the movement of an enemy character on the map; and
   a module that causes, when an enemy character comes into contact with the procession, the non-player characters belonging to the procession behind the position of contact to break away from the procession.

3. The non-transitory computer readable medium according to claim 1, further comprising:
   a module that calculates an accumulated total number of non-player characters belonging to the procession when the player's character moves to a predetermined place on the map; and
   a module that determines that the game is successfully completed when the accumulated total number of non-player characters reaches a predetermined number.

4. A game device comprising:
   a player's character controller operative to control the movement of a player's character on a map;
   a non-player character controller operative to cause, of those non-player characters located on the map, non-player characters located within a predetermined range from a position of the player's character to join a procession following the player's character, and to move the non-player characters belonging to the procession to a position previously occupied by the player's character to allow the non-player characters to follow the player's character; and a procession controller operative to increase, upon receipt of a predetermined control input, the speed at which the non-player characters belonging to the procession move to the position previously occupied by the player's character and to gather the non-player characters near the player's character.

5. A game control method comprising:
   controlling the movement of a player's character on a map;
   causing, of those non-player characters located on the map, non-player characters located within a predetermined range from a position of the player's character to join a procession following the player's character;
   moving the non-player characters belonging to the procession to a position previously occupied by the player's character to allow the non-player characters to follow the player's character; and
   increasing, upon receipt of a predetermined control input, the speed at which the non-player characters belonging to the procession move to the position previously occupied by the player's character and gathering the non-player characters near the player's character.

6. A non-transitory computer readable medium having embodied thereon a game control program product that causes a computer to move a player's character and an enemy character on a map, the program product comprising:
   a module that controls the movement of the player's character on the map;
   a module that controls the movement of the enemy character on the map;
   a module that generates a first screen on which the player's character and the enemy character are displayed on the map;
   a module that generates a second screen that visually distinguishes between an area on the map where the player's character can move and an area where the player's character cannot move and that does not display the enemy character; and
   a module that switches between the first screen and the second screen for display.

7. The non-transitory computer readable medium according to claim 6, wherein
   the second screen displays an item or a character not displayed on the first screen.

8. The non-transitory computer readable medium according to claim 6, further comprising:
   a module that moves, of those non-player characters located in a building located on the map, non-player characters located in the building within a predetermined range from the position of the player's character outside the building;

a module that causes, of those non-player characters outside the building, non-player characters located within a predetermined range from the position of the player's character to join a procession following the player's character;

a module that calculates an accumulated total number of non-player characters belonging to the procession when the player's character moves to a predetermined place on the map; and a module that determines that the game is successfully completed when the accumulated total number of non-player characters reaches a predetermined number.

9. The non-transitory computer readable medium according to claim 8, further comprising a module that causes, when an enemy character comes into contact with the procession, the non-player characters belonging to the procession behind the position of contact to break away from the procession.

10. The non-transitory computer readable medium according to claim 8, wherein the second screen displays the distribution of the non-player characters located in the building located on the map.

11. A game device comprising:

a player's character controller operative to control the movement of a player's character on a map;

an enemy character controller operative to control the movement of an enemy character on the map;

a first screen controller operative to generate a first screen on which the player's character and the enemy character are displayed on the map;

a second screen controller operative to generate a second screen that visually distinguishes between an area on the map where the player's character can move and an area where the player's character cannot move and that does not display the enemy character; and a switcher operative to switch between the first screen and the second screen for display.

12. A game control method comprising:

controlling the movement of a player's character on a map;

controlling the movement of an enemy character on the map;

generating a first screen on which the player's character and the enemy character are displayed on the map;

generating a second screen that visually distinguishes between an area on the map where the player's character can move and an area where the player's character cannot move and that does not display the enemy character; and switching between the first screen and the second screen for display.

* * * * *